(12) United States Patent
Tsai et al.

(10) Patent No.: US 12,322,218 B2
(45) Date of Patent: Jun. 3, 2025

(54) METHOD AND SYSTEM FOR EVALUATING A MAINTENANCE REQUIREMENT OF A LINEAR TRANSMISSION DEVICE

(71) Applicant: HIWIN TECHNOLOGIES CORP., Taichung (TW)

(72) Inventors: Shang-Hua Tsai, Taichung (TW); Yu-Hsin Lin, Taichung (TW); Meng-Ying Lin, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 324 days.

(21) Appl. No.: 17/829,862

(22) Filed: Jun. 1, 2022

(65) Prior Publication Data
US 2023/0394890 A1 Dec. 7, 2023

(51) Int. Cl.
*G07C 5/00* (2006.01)
*F16H 57/01* (2012.01)

(52) U.S. Cl.
CPC ............ *G07C 5/006* (2013.01); *F16H 57/01* (2013.01); *F16H 2057/012* (2013.01)

(58) Field of Classification Search
CPC .............. G07C 5/006; F16H 2057/012; F16H 57/0449; F16H 57/0497; F16H 57/01; F16N 2250/18; F16N 2250/08; F16N 29/04; G01M 13/02; F16A 57/0497
See application file for complete search history.

(56) References Cited

U.S. PATENT DOCUMENTS

2021/0071742 A1* 3/2021 Huynh ................ F16H 25/2204

FOREIGN PATENT DOCUMENTS

| CN | 108025431 A | | 5/2018 | |
|---|---|---|---|---|
| CN | 110132584 A | * | 8/2019 | |
| DE | 11 2015 004 730 T5 | | 7/2017 | |
| DE | 10 2018 219 327 A1 | | 5/2019 | |
| DE | 10 2020 116 408 A1 | | 12/2021 | |
| WO | WO-2009027255 A2 | * | 3/2009 | ............ F16H 57/01 |

OTHER PUBLICATIONS

German Office Action for corresponding German Application No. 102022205592.6, dated Mar. 13, 2023, with English translation.
Taiwanese Search Report for corresponding Taiwanese Application No. 111107755, dated Oct. 13, 2022, with English translation.

* cited by examiner

*Primary Examiner* — Jennifer Bahls
(74) *Attorney, Agent, or Firm* — Birch, Stewart, Kolasch & Birch, LLP

(57) ABSTRACT

A method is provided for evaluating a maintenance requirement of a linear transmission device that is driven by a driving device. A control unit receives, from a sensing unit, a plurality of electric sensor signals that respectively correspond to multiple physical quantities of the linear transmission device or the driving device. The control unit calculates at least four correction factors based on the electric sensor signals, and calculates a service life of the linear transmission device based on the electric sensor signals and the at least four correction factors for scheduling maintenance of the linear transmission device.

8 Claims, 4 Drawing Sheets

METHOD AND SYSTEM FOR EVALUATING A MAINTENANCE REQUIREMENT OF A LINEAR TRANSMISSION DEVICE

FIELD

The disclosure relates to a method and a system related to device maintenance, and more particularly to a method and a system for evaluating a maintenance requirement of a linear transmission device.

BACKGROUND

After a long period of use, a linear transmission device may have fatigue spalling occurring at an inlet opening and/or an outlet opening of a return channel thereof. When the spalling reaches a certain extent, the linear transmission device may need repair or component replacement to ensure the quality of processing.

Currently, most machine maintenance is performed on an annual or periodic basis, or using the cumulative operating time or a cumulative number of operating cycles to determine the need for repair or replacement of components. However, since a machine may operate under different loads in view of the differences among objects being processed, the damages attributed to each operation may be different. As a result, with the same cumulative operating time or cumulative number of operating cycles, different loads may cause different levels of damage. Therefore, if the remaining service life is estimated only by a pre-defined operation time or operation cycle number, the estimation would be inaccurate.

SUMMARY

Therefore, an object of the disclosure is to provide a method that can evaluate a maintenance requirement of a linear transmission device with a higher accuracy.

According to the disclosure, the method includes steps of: by a control unit communicatively connected to the driving device, receiving, from a sensing unit that is installed on one or both of the linear transmission device and the driving device and that is disposed to sense multiple physical quantities related to the one or both of the linear transmission device and the driving device, a plurality of electric sensor signals that respectively correspond to the physical quantities; by the control unit, calculating at least four correction factors based on the electric sensor signals; and by the control unit, calculating a service life of the linear transmission device based on the electric sensor signals and the at least four correction factors for scheduling maintenance of the linear transmission device.

Another object of the disclosure is to provide a system that can evaluate a maintenance requirement of a linear transmission device with a higher accuracy.

According to the disclosure, the system includes a linear motion unit, a sensing unit and a control unit. The linear motion unit includes the linear transmission device, and a driving device disposed to drive the linear transmission device. The sensing unit is installed on the linear motion unit for sensing multiple physical quantities related to operation of the linear motion unit, so as to output a plurality of electric sensor signals that respectively correspond to the physical quantities. The control unit is communicatively connected to the linear motion unit and the sensing unit for controlling operation of the linear motion unit, and for receiving the electric sensor signals from the sensing unit, and is configured to calculate at least four correction factors based on the electric sensor signals, and to calculate a service life of the linear transmission device based on the electric sensor signals and the at least four correction factors for scheduling maintenance of the linear transmission device.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
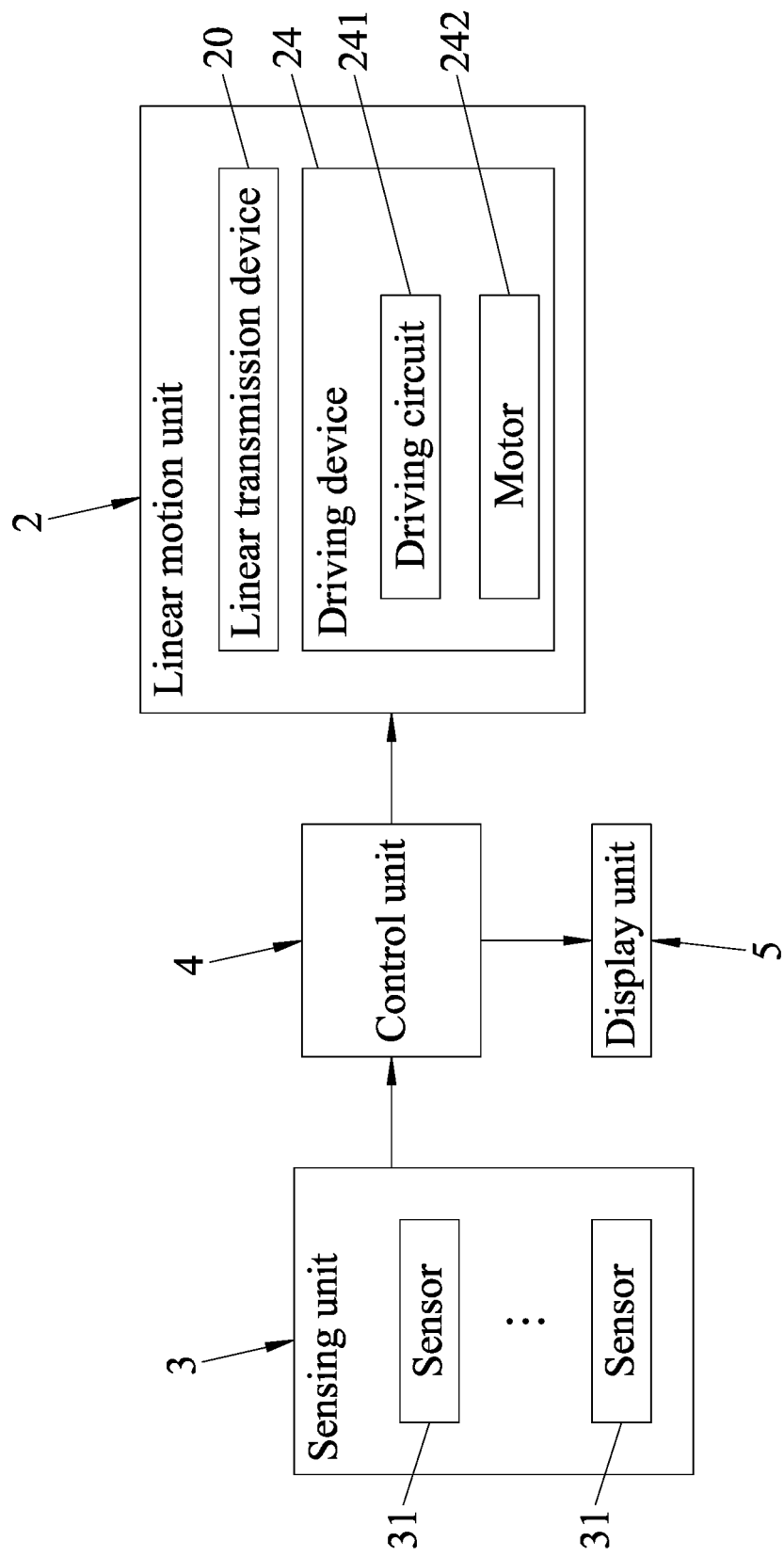
FIG. 1 is a block diagram illustrating an embodiment of a system for evaluating a maintenance requirement of a linear transmission device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
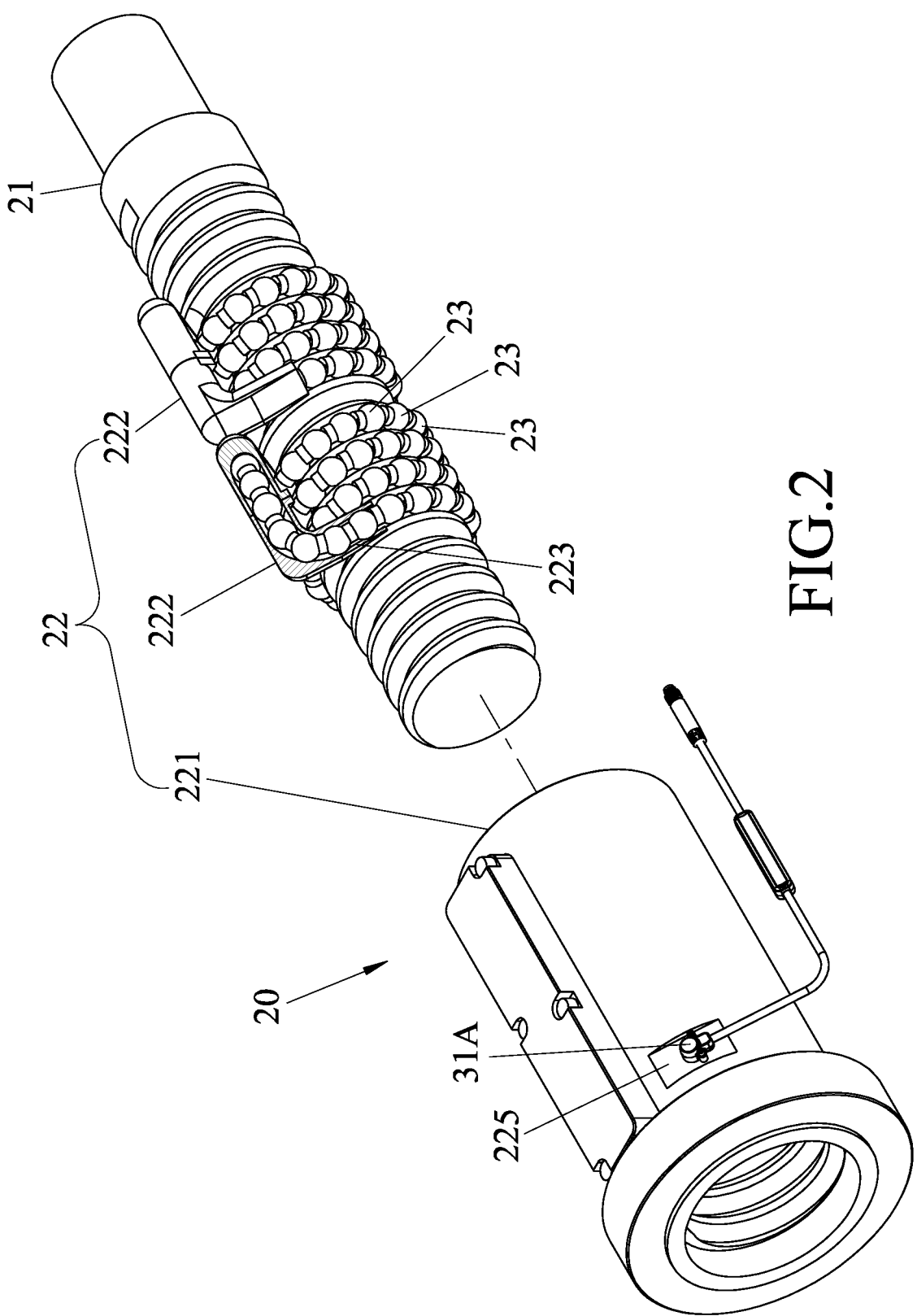
FIG. 2 is an exploded perspective view illustrating a part of the embodiment.
Figure 3:
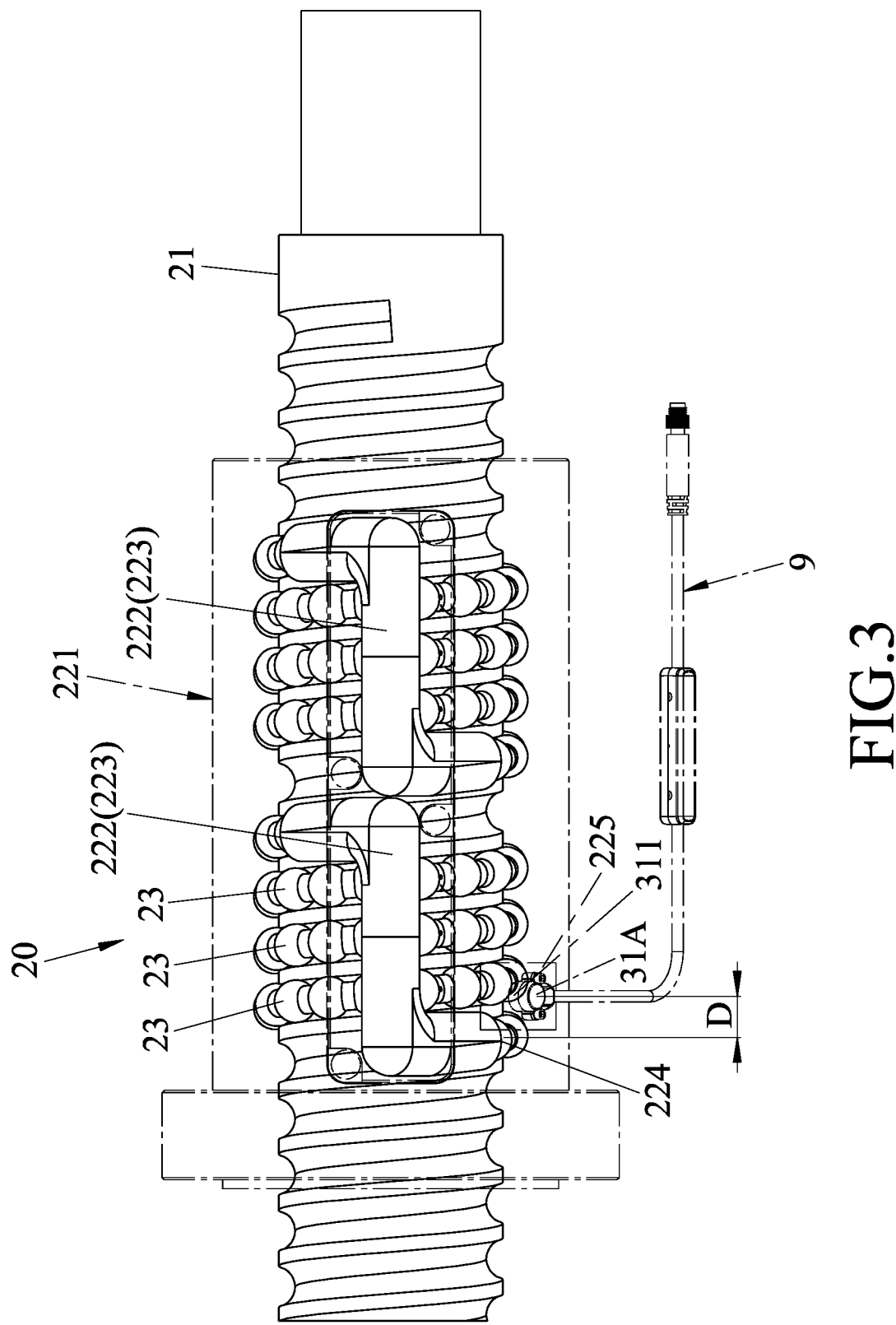
FIG. 3 is a side view illustrating a part of the embodiment.

Referring to FIGS. 1 to 3, an embodiment of a system for evaluating a maintenance requirement of a linear transmission device 20 according to this disclosure is provided. The linear transmission device 20 cooperates with a driving device 24 to constitute a linear motion unit 2, and is to be driven into operation by the driving device 24. The system includes the linear motion unit 2, a sensing unit 3 installed on the linear transmission device 20 and/or the driving device 24, and a control unit 4 communicatively connected to the sensing unit 3 and the driving device 24. Optionally, the system may further include a display unit 5 communicatively connected to the control unit 4.

The linear transmission device 20 includes a shaft 21 that extends in an axial direction, a moving member 22 that is disposed on the shaft 21, and a plurality of rolling members 23.

In this embodiment, the linear transmission device 20 is exemplified as a ball screw, where the shaft 21 is a threaded shaft, the moving member 22 is a nut, and the rolling members 23 are balls. In one embodiment, the linear transmission device 20 may be a linear slide (not shown), where the shaft 21 is a slide rail, the moving member 22 is a runner block, and the rolling members 23 are balls. However, this disclosure is not limited in this respect, and the linear transmission device 20 may be other types of transmission devices that involves linear motion in other embodiments.

The moving member 22 includes a main body 221, and one or more return mechanisms 222 disposed on the main body 221. In this embodiment, the moving member 22 includes two return mechanisms 22, each defining a return channel 223 for the rolling members 23 to roll in the return channel 223 and between the shaft 21 and the moving member 22 for recirculation of the rolling members 23. The return channel 223 has an inlet opening and an outlet opening. It is noted that the return mechanisms 222 in FIG.

2 are drawn to be separate from the main body 221 of the moving member 22 in order to illustrate the recirculation of the rolling members 23, but they are actually attached to, for example, an inner surface of the main body 221 in practice. For the return channel 223, one of the openings thereof may be defined as a return point 224. In FIG. 3, the left opening is defined as the return point 224 for the return channel 223 of the left one of the return mechanisms 22.

The driving device 24 is configured to drive a relative linear motion between the shaft 21 and the moving member 22, and includes a driving circuit 241 and a motor 242.

Since one having ordinary skill in the art should be able to derive how to make the linear motion unit 2 based on the above descriptions, details thereof are omitted herein for the sake of brevity.

The sensing unit 3 includes multiple sensors 31 to sense multiple physical quantities related to operation of the linear transmission device 20 and/or the driving device 24, and the sensors 31 generate a plurality of electric sensor signals that respectively correspond to the physical quantities sensed thereby.

In the illustrative embodiment, an outer surface of the main body 221 is formed with a recess 225, and the sensors 31 include, for example, a temperature sensor chip and/or an accelerometer (referred to as sensor 31A herein) that is threadedly attached to the main body 221 at the recess 225. The sensor 31A may have a sensing end 311 embedded in the main body 221, so as to achieve better sensing by way of firm installation. The sensor 31A is disposed to correspond in position to the return point 224 of the return channel 223 of the left one of the return mechanisms 22. To be specific, the sensor 31A is disposed close to the return point 224 in a circumferential direction of the shaft 21, and is spaced apart from the return point 224 in the axial direction by a distance D smaller than a predetermined distance. In other words, the sensor 31A is located at the same or nearly the same position with respect to the shaft 21 in the radial direction, and a distance between a center of the recess 225 and a center the return point 224 in the axial direction is smaller than the predetermined distance. In some embodiments, the predetermined distance may be set to be three times a diameter of the balls (i.e., the rolling members 23) or three times a screw lead of the threaded shaft (i.e., the shaft 21). Since the sensor 31A is proximate to the return point 224, the sensor 31A can sense a temperature and/or an acceleration (impact) of the linear transmission device 20 at the return point 224 more accurately. In FIG. 3, the main body 221, the sensor 31A and a transmission wire 9 that connects the sensor 31A to the control unit 4 are drawn using chain lines for the sake of clarity.

In addition to the temperature and the acceleration (two physical quantities), the other sensors 31 may be used to sense other physical quantities, such as a stress (load) suffered by the linear transmission device 20, a stroke length of the moving member 22 relative to the shaft 21, and a speed of the moving member 22 relative to the shaft 21 in the axial direction. The sensors 31 may include a force sensor, which may be realized using a piezoelectric chip, a displacement meter, a strain gauge, etc., to sense the stress suffered by, for example, contact surfaces between the rolling members 23 and the shaft 21 and/or between the rolling members 23 and the return mechanisms 222. The stroke length may refer to a distance travelled by the linear motion of the moving member 22 relative to the shaft 21. In one example, an optical scale or an optical encoder may be used to measure the distance or stroke length. In one example, a rotary encoder or a Hall sensor may be used to measure a number of turns the motor 242 rotates, so as to calculate the distance or stroke length. The speed refers to a speed of linear movement of the moving member 22 relative to the shaft 21 in the axial direction, or a rotational speed of the shaft 21 (e.g., the threaded shaft). The linear speed or the rotational speed may be calculated based on the distance or stroke length measured by the optical scale, the optical encoder, the rotary encoder or the Hall sensor.

The control unit 4 may be, for example, a computer, a processor or a microcontroller that controls operation of the linear motion unit 2, receives the electric sensor signals from the sensing unit 3, calculates at least four correction factors based on the physical quantities as indicated by the electric sensor signals, and calculates a service life of the linear transmission device 20 based on the physical quantities and the at least four correction factors so as to facilitate scheduling of maintenance for the linear transmission device 20. Among the at least four correction factors, at least two correction factors each have a non-linear relationship with the corresponding one of the physical quantities.

The correction factors may include a load correction factor, a stroke length correction factor, a speed correction factor, a temperature correction factor and an impact correction factor. Users may select four or more of the correction factors based on actual demands and use the corresponding electric sensor signals to calculate the selected correction factors.

In one example, the control unit 4 may calculate the service life according to:

$$L_{left} = \left(1 - CY \times \frac{1}{L_{act}}\right) \times 100\% \quad (1)$$
$$= \left(1 - CY \times \frac{1}{L_{basic}} \times X_l\right) \times 100\%$$

$$X_l = \frac{L_{basic}}{L_{act}} \cong \left[\frac{F_{act}}{A_{general} \times F_{basic}}\right]^3 \quad (2)$$

$L_{left}$ represents the service life of the linear transmission device 20. CY represents a number of cumulative operating cycles of the linear transmission device 20. $L_{act}$ represents an actual service life span of the linear transmission device 20, which is a service life span of the linear transmission device 20 that is calculated based on an actual operating condition. As an example, $L_{act}$ may be a number of operating cycles the linear transmission device 20 can operate under the actual operating condition. $L_{basic}$ represents a theoretical service life span of the linear transmission device 20, which may be a number of operating cycles the linear transmission device 20 can operate under a theoretical operating condition or a standard operating condition. $X_i$ represents a life consumption equivalent, which is a ratio of the theoretical service life span $L_{basic}$ to the actual service life span $L_{act}$. Therefore, $$\frac{1}{L_{act}}$$

represents a life-consuming ratio that is a ratio of the service life to be consumed by one operating cycle under the actual operating condition (namely the damages caused on the service life as attributed to one operating cycle under the actual operating condition) to the actual service life span, and $$\frac{1}{L_{act}} = \frac{1}{L_{basic}} \times X_l \cdot F_{act}$$

represents an actual work equivalent. $F_{basic}$ represents a theoretical work equivalent, which is a value acquired based on specifications of the linear transmission device 20. $A_{general}$ is a system safety factor, which is a specification of the linear transmission device 20. For example, the system safety factor $A_{general}$ may be set to 1.1, 1.3 and 2 respectively when the impact expected to be suffered by the linear transmission device 20 during operation is at level 1 (smoothness), level 2 (normal) and level 3 (impact vibration). In this example, the service life $L_{left}$ is a remaining service life value presented in percentage. For instance, if the service life $L_{left}$ is 80%, it means that the linear transmission device 20 still has 80% of the complete actual service life span. In some other examples, the service life may be a consumed service life value. For instance, if the consumed service life value is 20%, it means that the linear transmission device 20 still has 80% of the complete actual service life span.

The abovementioned equations are described in more detail hereinafter by exemplifying the linear transmission device 20 as a ball screw. The theoretical service life span $L_{basic}$ and the actual service life span $L_{act}$ can be calculated according to:

$$L_{basic} = \frac{\text{Lead}}{2 \times \text{Stroke}_{basic}} \times \left[\frac{Ca}{A_{general} \times F_{basic}}\right]^3 \times 10^6 \quad (3)$$

$$L_{act} = \frac{\text{Lead}}{2 \times \text{Stroke}_{act}} \times \left[\frac{Ca}{F_{act}}\right]^3 \times 10^6 \quad (4)$$

The unit for the theoretical service life span $L_{basic}$ and the actual service life span $L_{act}$ thus calculated is one operating cycle. Lead represents a screw lead of the threaded shaft (i.e., the shaft 21). Ca represents a dynamic load rating of the linear transmission device 20, which is acquired based on the specifications of the linear transmission device 20. $\text{Stroke}_{basic}$ represents a theoretical value of the stroke length of the linear transmission device 20. $\text{Stroke}_{act}$ represents an actual value of the stroke length of the linear transmission device 20. In general, $\text{Stroke}_{basic} \cong \text{Stroke}_{act}$, so the life consumption equivalent $X_l$ can be calculated using equation (2).

In this embodiment, since the linear transmission device 20 is exemplified as a ball screw, the shaft 21 is a threaded shaft that is rotatable to bring the nut (i.e., the moving member 22) into linear movement in the axial direction. The operating cycle of the linear transmission device 20 is divided into a number n of time periods, where n is a positive integer greater than one. The control unit 4 may calculate the actual work equivalent $F_{act}$ according to:

$$F_{act} = \frac{A_s}{A_t \times A_i} \times \sqrt[3]{\sum_{i=1}^{n} \left(\frac{A_f^3}{A_r^3} \times F_{i\_avg}^3 \times \frac{N_{i\_avg}}{N_{avg}} \times \frac{t_i}{t_{cycle}}\right)} \quad (5)$$

$A_t$ represents the temperature correction factor. $A_s$ represents the stroke length correction factor. $A_i$ represents the impact correction factor. $A_f$ represents the load correction factor. $A_r$ represents the speed correction factor. $F_{i\_avg}$ represents an average load of the linear transmission device 20 during an $i^{th}$ one of the time periods. $N_{i\_avg}$ represents an average rotational speed of the threaded shaft during the $i^{th}$ one of the time periods. $N_{avg}$ represents an average rotational speed of the threaded shaft during the operating cycle of the linear transmission device 20. $t_i$ represents a length of the $i^{th}$ one of the time periods. $t_{cycle}$ represents a length of the operating cycle.

Users may select, based on actual demands, at least four of the correction factors for use in equation (5), calculate the selected correction factors based on corresponding physical quantities as indicated by the electric sensor signals, apply the selected correction factors thus calculated to equation (5) to obtain the actual work equivalent $F_{act}$ by making the non-selected correction factor one, and calculate the service life $L_{left}$ according to equations (1) and (2).

In this embodiment, the load correction factor $A_f$, the stroke length correction factor $A_s$, the temperature correction factor $A_t$ and the impact correction factor $A_i$ each have a non-linear relationship with the corresponding one of the physical quantities. In general, two data pieces of a physical quantity may be used to create a correction line for the physical quantity when only a few data pieces can be used for analysis, so the physical quantity and the corresponding correction factor will have a linear relationship, which may lead to poor accuracy in correction results. In this embodiment, at least two of the correction factors are calculated by applying a non-linear calculation on the corresponding physical quantity, so as to achieve higher accuracy.

The load correction factor $A_f$ can be defined as:

$$A_f = a_f \times P_{max}^3, \text{ when } P_{max} > 2.0 \text{ GPa; and} \quad (6)$$

$A_f = 1$, when otherwise, where $a_f$ is a load coefficient that can be obtained through experimentation, and $P_{max}$ represents a maximum value of the stress obtained from the electric sensor signals. In some embodiments, the load coefficient $a_f$ may be set to be about 0.125, but this disclosure is not limited in this respect.

The stroke length correction factor $A_s$ can be defined as:

$$A_s = \left(\frac{TU}{\Theta}\right)^{0.5}, \text{ when } \Theta < TU; \text{ and} \quad (7)$$

$A_s = 1$, when otherwise, where $\Theta$ represents a number of thread turns of the threaded shaft that the moving member 22 would move past when moving along the shaft 21 in the operating cycle, TU represents a turns unit, which refers to a number of thread turns of the threaded shaft that one return mechanism 222 extends across. In some embodiments, TU is set in a range from about 2 to about 5, but this disclosure is not limited in this respect.

The speed correction factor $A_r$ can be defined as:

$$A_r = \frac{DN_{MAX}}{DN_{op}} = a_r \times \frac{\omega_{MAX}}{\omega_{op}}, \text{ when } DN_{op} > DN_{MAX}; \quad (8)$$

and $A_r = 1$, when otherwise, where $DN_{MAX}$ represents an upper limit (allowable maximum value) of a DN value for the linear transmission device 20, $DN_{op}$ represents a maximum DN value obtained from the electric sensor signals, the DN value is a product of the rotational speed and an outer diameter of the shaft 21, $a_r$ represents a speed coefficient, $\omega_{MAX}$ represents an upper limit of the rotational speed of the shaft 21, and $\omega_{op}$ represents a maximum rotational speed of the shaft 21 obtained from the electric sensor signals. In some embodiments, $a_r$ is set in a range from about 1.5 to about 2, but this disclosure is not limited in this respect.

The temperature correction factor $A_t$ can be defined as:

$$A_t = a_{t1} \times T^3 + a_{t2} \times T^2 + a_{t3} \times T + a_{t4}, \quad (9)$$

when the temperature obtained from the electric sensor signals is in a range from about 80° C. to about 200° C.; and $A_t$=1, when otherwise, where T represents the temperature obtained from the electric sensor signals, and $a_{t1}$, $a_{t2}$, $a_{t3}$ and $a_{t4}$ are temperature coefficients, which can be set based on actual demands. In some embodiments, $a_{t1}=-1 \times 10^{-7}$, $a_{t2}=3 \times 10^{-5}$, $a_{t3}=-0.004$, and $a_{t4}=1.1$, but this disclosure is not limited in this respect.

The impact correction factor $A_i$ can be defined as:

$A_i$=0, when the acceleration sensed by the sensor 31A is greater than 15 g (gravitational acceleration); and $A_i$=1, when otherwise.

The display unit 5 may include a screen that is operable by the control unit 4 to display the service life $L_{left}$ of the linear transmission device 20 for users to view.

Figure 4:
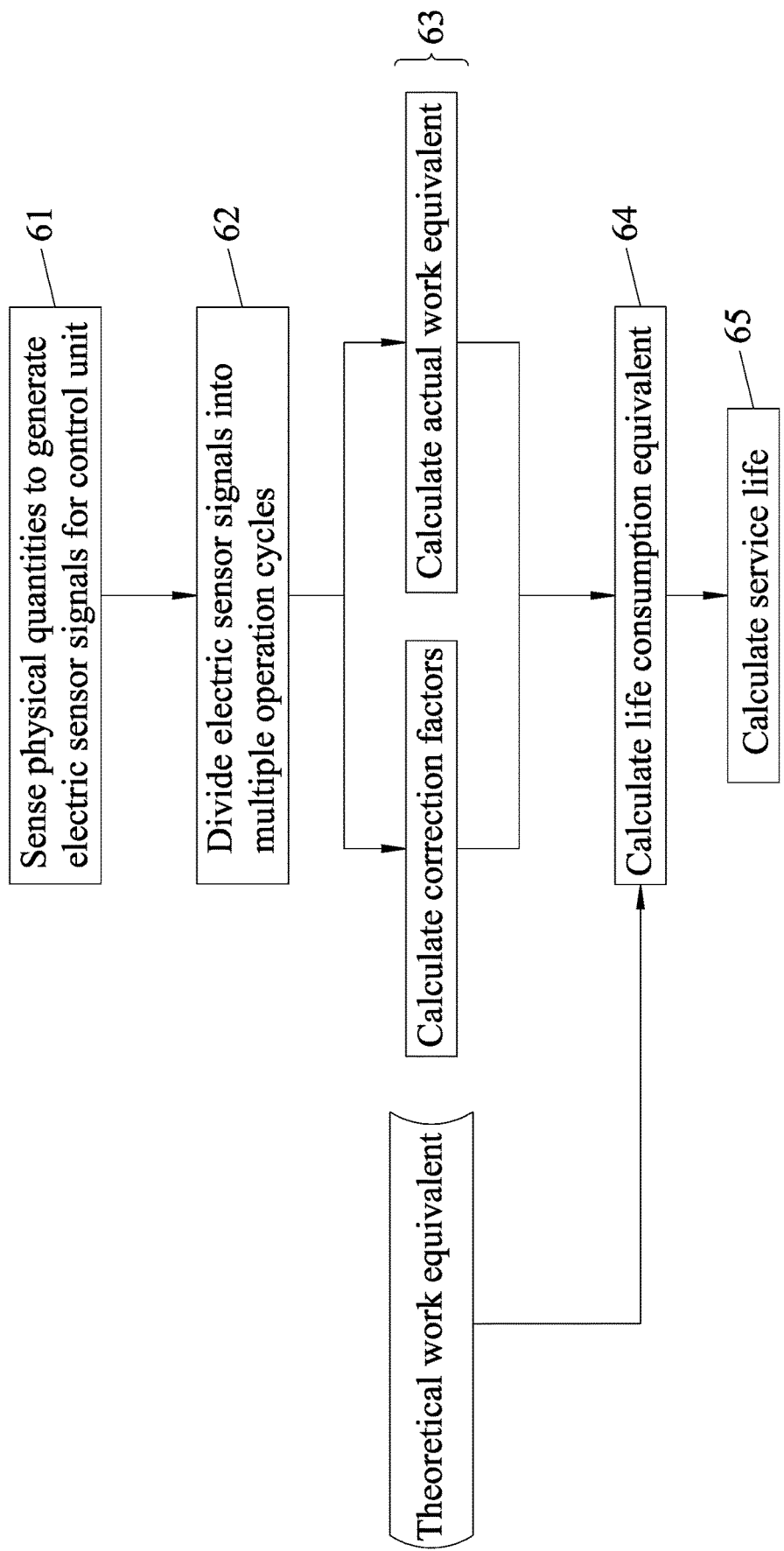
FIG. 4 is a flow chart illustrating steps of an embodiment of a method for evaluating a maintenance requirement of a linear transmission device according to the disclosure.

Referring to FIGS. 1 and 4, an embodiment of a method for evaluating the maintenance requirement of the linear transmission device 20 according to this disclosure is provided to be implemented by the system, and includes steps 61 through 65.

In step 61, the sensing unit 3 senses the physical quantities which include the stress, the stroke length, the speed, the temperature and the acceleration that are related to the linear transmission device 20 as mentioned above, and outputs the corresponding electric sensor signals that indicate the physical quantities.

In step 62, the control unit 4 receives the electric sensor signals, divides each of the electric sensor signals into multiple operating cycles, and divides each operation cycle into multiple time periods.

In step 63, the control unit 4 calculates the at least four selected correction factors and the actual work equivalent $F_{act}$ based on the physical quantities as indicated by the electric sensor signals and the abovementioned equations.

In step 64, the control unit 4 calculates the life consumption equivalent $X_l$ by applying the actual work equivalent $F_{act}$, the pre-stored theoretical work equivalent $F_{basic}$, and the system safety factor $A_{general}$ to equation (2).

In step 65, the control unit 4 calculates the service life $L_{left}$ by applying the life consumption equivalent $X_l$, the cumulative operating cycles CY, and the theoretical service life span $L_{basic}$ to equation (1). Then, the control unit 4 displays the service life $L_{left}$ on the display unit 5 for viewing by users.

In some embodiments, steps 64 and 65 can be replaced by a step of calculating the actual service life span $L_{act}$ using equation (4), and a step of using equation (1) to calculate the service life $L_{left}$ based on the cumulative operating cycles CY and the actual service life span $L_{act}$.

Hereinafter, an actual case is provided for explanation. Table 1 lists specifications of a ball screw, which are used to calculate the stroke length correction factor $A_s$, the temperature correction factor $A_t$, the impact correction factor $A_i$, the load correction factor $A_f$, the speed correction factor $A_r$, the actual work equivalent $F_{act}$, the life consumption equivalent $X_l$, and the life-consuming ratio $$\frac{1}{L_{act}}$$

as listed in Tables 2 to 4, which correspond to different operating conditions, where Table 2 corresponds to a general operating condition, Table 3 corresponds to a high-load operating condition, and Table 4 corresponds to a short-stroke low-load operating condition. Comparing Table 3 with Table 2, it is seen that, when the ball screw operates under the high-load operating condition, the life consumption equivalent $X_l$ significantly increases and thus the life-consuming ratio $$\frac{1}{L_{act}}$$

increases, namely, the service life to be consumed in one operating cycle will be greater than a theoretical value. Comparing Table 4 with Table 2, it is seen that, when the ball screw operates under the short-stroke low-load operating condition, the life consumption equivalent $X_l$ decreases and thus the life-consuming ratio $$\frac{1}{L_{act}}$$

is reduced, namely, the service life to be consumed in one operating cycle will be smaller than the theoretical value.

TABLE 1

Specs of Ball Screw

| | | |
|---|---|---|
| Outer Diameter of Threaded Shaft | 100 | mm |
| Lead | 25 | mm |
| Ball Diameter | 19.05 | mm |
| Turns Unit | 3.8 | — |
| Turn No. | 2 | — |
| Ca | 81,410 | kgf |
| $F_{basic}$ | 24,423 | kgf |
| $A_{general}$ | 1.3 | — |
| Upper Limit of Stress | 2.0 | GPa |
| $DN_{MAX}$ | 160,000 | rpm-mm |
| Maximum Stroke Length | 100 | mm |
| $L_{basic}$ | 2,107,250 | cycle |

In Table 1, the "Turn No." refers to a number of the turns unit (i.e., the number of sets of the return mechanisms 222 and the rolling members), which is equal to two in FIG. 2.

In the following Tables 2 to 4, one operating cycle is exemplified to include two stages (i.e., stage 1 and stage 2, and the operating cycle is divided into two periods) in which the loads and rotational speeds of the threaded shaft are different, and $\omega_i$ represents the rotational speed of the threaded shaft in stage i. As an example, in Table 2, the actual maximum rotational speed $\omega_{op}$ is 750 rpm (i.e., the rotational speed in stage 1).

TABLE 2

Operation condition 1 (general condition)

| | | | | |
|---|---|---|---|---|
| Stroke length | 100 | mm | $A_s$ | 1 |
| Operating temperature | 60 | ° C. | $A_t$ | 1 |

TABLE 2-continued

| | Maximum vibration during operation (impact) | 1 | g (gravitational acceleration) | $A_i$ | 1 | |
|---|---|---|---|---|---|---|

| Stage | Time length $t_i$ (sec) | $\omega_i$ (rpm) | Load $F_i$ | $P_{max}$ | $A_f$ | $A_r$ |
|---|---|---|---|---|---|---|
| 1 | 3 | 750 | 15000 | 1.6 | 1 | 1 |
| 2 | 2 | 200 | 2000 | 0.8 | 1 | 1 |
| | $N_{avg}$ | | 530 | | rpm | |
| | $F_{act}$ | | 16844 | | kgf | |
| | $X_l$ | | 15 | | % | |
| $\left(\dfrac{1}{L_{act}}\right)$ | | | 7.1E−8 | | 1/cycle | |

TABLE 3

Operation condition 2 (high-load condition)

| Stroke length | 100 | mm | $A_s$ | 1 |
| Operating temperature | 100 | °C. | $A_t$ | 0.9 |
| Maximum vibration during operation (impact) | 1 | g (gravitational acceleration) | $A_i$ | 1 |

| Stage | Time length $t_i$ (sec) | $\omega_i$ (rpm) | Load $F_i$ | $P_{max}$ | $A_f$ | $A_r$ |
|---|---|---|---|---|---|---|
| 1 | 3 | 750 | 35000 | 2.1 | 1.16 | 1 |
| 2 | 2 | 2000 | 500 | 0.5 | 1 | 1.25 |
| | $N_{avg}$ | | 1250 | | rpm | |
| | $F_{act}$ | | 37970 | | kgf | |
| | $X_l$ | | 171 | | % | |
| $\left(\dfrac{1}{L_{act}}\right)$ | | | 8.1E−7 | | 1/cycle | |

TABLE 4

Operation condition 3 (short-stroke low-load condition)

| Stroke length | 75 | mm | $A_s$ | 1.13 |
| Operating temperature | 100 | °C. | $A_t$ | 0.9 |
| Maximum vibration during operation (impact) | 1 | g (gravitational acceleration) | $A_i$ | 1 |

| Stage | Time length $t_i$ (sec) | $\omega_i$ (rpm) | Load $F_i$ | $P_{max}$ | $A_f$ | $A_r$ |
|---|---|---|---|---|---|---|
| 1 | 3 | 1000 | 1000 | 0.7 | 1 | 1 |
| 2 | 2 | 2000 | 500 | 0.5 | 1 | 1.25 |
| | $N_{avg}$ | | 1400 | | rpm | |
| | $F_{act}$ | | 1164 | | kgf | |
| | $X_l$ | | 0.00492 | | % | |
| $\left(\dfrac{1}{L_{act}}\right)$ | | | 1.8E−11 | | 1/cycle | |

In some embodiments, the method for evaluating the maintenance requirement of the linear transmission device 20 according to this disclosure may further include calculating a lubricant consumption equivalent $X_o$ and a lubricant life $L_{oil}$, and displaying the lubricant consumption equivalent $X_o$ and the lubricant life $L_{oil}$ on the display unit 5 for viewing by users, where the lubricant consumption equivalent $X_o$ is a ratio of a theoretical lubricating cycle number (i.e., a theoretical number of operating cycles after which the linear transmission device 20 should be lubricated) to an actual lubricating cycle number (i.e., an actual number of operating cycles after which the linear transmission device 20 will be lubricated). Users or the control unit 4 can determine whether to turn on a lubricant oil feeder (not shown) to add lubricant oil (i.e., to schedule replenishment of lubricant) to the linear transmission device 20 based on the lubricant life $L_{oil}$.

In some embodiments, the lubricant consumption equivalent $X_o$ may be calculated according to:

$$X_o = \frac{1}{f} = \left[a_o \times \left(\frac{F_{MAX}}{F_{op}}\right) + b_o \times \left(\frac{DN_{MAX}}{DN_{op}}\right)\right]^{-1} \quad (10)$$

where f is a lubricant consumption variable, $a_o$ and $b_o$ are lubricant consumption coefficients that can be defined based on actual demands (as an example, $a_o$=0.8 and $b_o$=0.2), $F_{MAX}$ represents an upper limit of load for the linear transmission device 20, and $F_{op}$ represents a maximum load of the linear transmission device 20 obtained from the electric sensor signals in the operating cycle.

The lubricant life $L_{oil}$ may be calculated according to:

$$L_{oil} = \left(1 - CY \times \frac{1}{CY_{oil-basic}} \times X_o\right) \times 100\% \quad (11)$$

where $CY_{oil-basic}$ represents the theoretical lubricating cycle number, so $$\left(\frac{1}{CY_{oil-basic}} \times X_o\right)$$

is a ratio of lubricant consumed in the operating cycle under the actual operating condition to an original amount of lubricant prior to the operation (e.g., an amount of fully-added lubricant). It is noted that the lubricant life $L_{oil}$ calculated using equation (11) represents a remaining lubricant life value (i.e., a ratio of the number of cycles the linear transmission device 20 can normally operate with the remaining lubricant to the number of cycles the linear transmission device 20 can normally operate with fully-added lubricant under the actual operating condition), but in some embodiments, the lubricant life may be calculated as a consumed lubricant life (i.e., a ratio of the number of cycles the linear transmission device 20 has operated since the last time the lubricant is fully added to the number of cycles the linear transmission device 20 can normally operate with fully-added lubricant under the actual operating condition), and this disclosure is not limited in this respect.

In summary, this embodiment calculates, based on the sensed physical quantities as indicated by the electric sensor signals, at least four correction factors, with at least two of them having non-linear relationships with the corresponding physical quantities. Then, the service life is calculated based on the sensed physical quantities and the correction factors. Since the calculation is performed based on the actual operating condition, the calculated service life may have higher accuracy, so the device vendor may schedule maintenance and/or parts replacement for the device (e.g., the linear transmission device 20) in a precise manner, thereby reducing the possibility of the device accidentally breaking down, which may result in unexpected loss. The embodiment may further calculate a lubricant consumption variable that is related to lubricant consumption of the device, so as to acquire the lubricant life for the device management personnel or the control unit 4 to determine whether to turn on the lubricant oil feeder to add lubricant oil to the device. As a result, the timing for lubricant replenishment can be appropriately adjusted based on the actual operating condition of the device, so as to achieve better quality of processing and a longer service life of the device. In the embodiment of the disclosure, the sensor 31A is arranged to correspond in position to the return point 224, thereby facilitating the sensor 31A to sense a condition at the opening of the return channel 223. Accordingly, the sensed result thus obtained can be close to the actual operating condition, and the calculated service life can be more accurate.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for evaluating a maintenance requirement of a linear transmission device that is driven by a driving device, comprising steps of:
   by a control unit communicatively connected to the driving device, receiving, from a sensing unit that is installed on one or both of the linear transmission device and the driving device and that is disposed to sense multiple physical quantities related to the one or both of the linear transmission device and the driving device, a plurality of electric sensor signals that respectively correspond to the physical quantities;
   by the control unit, calculating at least four correction the Is based on the electric sensor signals;
   by the control unit, calculating a service life of the linear transmission device based on the electric sensor signals and the at least four correction factors; and
   performing one of maintenance and parts replacement for the linear transmission device based on the service life of the linear transmission device thus calculated,
   wherein the linear transmission device includes a shaft, and a moving member disposed on the shaft, and the shaft is rotatable to bring the moving member into linear movement in an axial direction of the shaft;
   said method further comprising steps of:
   by the control unit, calculating a lubricant life based on a lubricant consumption variable f for scheduling replenishment of lubricant, where the lubricant consumption variable f is defined by:

$$f = a_o \times \left(\frac{F_{MAX}}{F_{op}}\right) + b_o \times \left(\frac{DN_{MAX}}{DN_{op}}\right),$$

where $a_o$ and $b_o$ are lubricant consumption coefficients, $F_{MAX}$ represents an upper limit of load for the linear transmission device, $F_{op}$ represents a maximum load of the linear transmission device obtained from the electric sensor signals, $DN_{MAX}$ represents an upper limit of a DN value for the linear transmission device, $DN_{op}$ represents a maximum DN value obtained from the electric sensor signals, and the DN value is a product of a rotational speed and an outer diameter of the shaft; and
   adding lubricant oil to the linear transmission device based on the lubricant life thus calculated.

2. The method of claim 1, wherein the linear transmission device includes a shaft, and a moving member disposed on the shaft;
   wherein, among the at least four correction factors, at least two correction factors each have a non-linear relationship with the corresponding one of the physical quantities; and
   wherein, among the physical quantities that correspond to the electric sensor signals, at least four physical quantities are selected from a group consisting of a stress suffered by the linear transmission device, a stroke length of the moving member relative to the shaft, a speed of the moving member relative to the shaft in an axial direction of the shaft, a temperature of the linear transmission device, and an acceleration of the moving member.

3. The method of claim 2, wherein the at least four correction factors are selected from a group consisting of a load correction factor that is calculated based on the stress, a stroke length correction factor that is calculated based on the stroke length, a speed correction factor that is calculated based on the speed, a temperature correction factor that is calculated based on the temperature, and an impact correction factor that is calculated based on the acceleration.

4. The method of claim 3, wherein the step of calculating the service life includes calculating an actual work equivalent based on the electric sensor signals and the at least four correction factors, and calculating the service life based on the actual work equivalent.

5. The method of claim 4, wherein the shaft is rotatable to bring the moving member into linear movement in the axial direction, the linear transmission device has an operating cycle that is divided into a number n of time periods, where n is a positive integer greater than one, and the actual work equivalent is calculated according to:

$$F_{act} = \frac{A_s}{A_t \times A_i} \times \sqrt[3]{\sum_{i=1}^{N}\left(\frac{A_f^3}{A_r^3} \times F_{i\_avg}^3 \times \frac{N_{i\_avg}}{N_{avg}} \times \frac{t_i}{t_{cycle}}\right)},$$

where $F_{act}$ represents the actual work equivalent, $A_t$ represents the temperature correction factor, $A_s$ represents the stroke length correction factor, $A_i$ represents the impact correction factor, $A_f$ represents the load correction factor, $A_r$ represents the speed correction factor, $F_{i\_avg}$ represents an average load of the linear transmission device during an $i^{th}$ one of the time periods, $N_{i\_avg}$ represents an average rotational speed of the shaft during the $i^{th}$ one of the time periods, $N_{avg}$ represents an average rotational speed of the shaft during the operating cycle of the linear transmission device, $t_i$ represents a length of the $i^{th}$ one of the time periods, and $t_{cycle}$ represents a length of the operating cycle.

6. The method of claim 5, wherein the load correction factor $A_f$ is defined by
$A_f = a_f \times P_{max}^3$ when $P_{max} > 2.0$ GPa, and $A_f = 1$ when otherwise, where $a_f$ is a load coefficient and $P_{max}$ represents a maximum value of the stress obtained from the electric sensor signals.

7. The method of claim 5, wherein the temperature correction factor is defined by $A_t = a_{t1} \times T^3 + a_{t2} \times T^2 + a_{t3} \times T + a_{t4}$ when the temperature obtained from the electric sensor signals ranges between 80° C. and 200° C., and is defined by $A_t = 1$ when otherwise, where T represents the temperature obtained from the electric sensor signals, and $a_{t1}$, $a_{t2}$, $a_{t3}$ and $a_{t4}$ are temperature coefficients.

8. A system for evaluating a maintenance requirement of a linear transmission device, comprising:

a linear motion unit that includes said linear transmission device, and a driving device disposed to drive said linear transmission device;

a sensing unit that is installed on said linear motion unit for sensing multiple physical quantities related to operation of said linear motion unit, so as to output a plurality of electric sensor signals that respectively correspond to the physical quantities; and a control unit that is communicatively connected to said linear motion unit and said sensing unit for controlling operation of said linear motion unit, and for receiving the electric sensor signals from said sensing unit, and that is configured to calculate at least four correction factors based on the electric sensor signals, and to calculate a service life of said linear transmission device based on the electric sensor signals and the at least four correction factors for scheduling maintenance of said linear transmission device, wherein said linear transmission device includes a shaft, a moving member disposed on said shaft to define at least one return channel that has multiple openings, and a plurality of rolling members disposed to roll between said shaft and said moving member and in said at least one return channel; and wherein said sensing unit includes a sensor disposed on said moving member for sensing at least one of the physical quantities, and a distance in an axial direction of said shaft between said sensor and one of said openings of said at least one return channel is smaller than three times a diameter of each of said rolling members.

* * * * *